(12) United States Patent
Liu et al.

(10) Patent No.: US 12,090,658 B2
(45) Date of Patent: Sep. 17, 2024

(54) ROBOT AND ITS SERVO MOTOR

(71) Applicant: Beijing Xiaomi Robot Technology Co., Ltd., Beijing (CN)

(72) Inventors: Yiyang Liu, Beijing (CN); Wenping Guo, Beijing (CN); Xiaomao Wei, Beijing (CN); Fang Zhi, Beijing (CN); Shuang Li, Beijing (CN)

(73) Assignee: Beijing Xiaomi Robot Technology Co., Ltd., Beijing (CN)

( * ) Notice: Subject to any disclaimer, the term of this patent is extended or adjusted under 35 U.S.C. 154(b) by 570 days.

(21) Appl. No.: 17/515,435

(22) Filed: Oct. 30, 2021

(65) Prior Publication Data
US 2022/0226985 A1 Jul. 21, 2022

(30) Foreign Application Priority Data
Jan. 15, 2021 (CN) .......................... 202120117227.X (51) Int. Cl.
| | | |
|---|---|---|
| B25J 9/12 | (2006.01) | |
| H02K 7/00 | (2006.01) | |
| H02K 7/10 | (2006.01) | |
| H02K 7/116 | (2006.01) | |
| H02K 11/215 | (2016.01) | |

(52) U.S. Cl.
CPC .............. B25J 9/126 (2013.01); H02K 7/003 (2013.01); H02K 7/1004 (2013.01); H02K 7/116 (2013.01); H02K 11/215 (2016.01); *G05B 2219/34013* (2013.01); *G05B 2219/39001* (2013.01)

(58) Field of Classification Search
CPC ... B25J 9/126; B25J 9/101; B25J 9/102; B25J 13/088; B25J 17/00; H02K 7/003; H02K 7/1004; H02K 7/116; H02K 11/215; H02K 11/30; H02K 2211/03; G05B 2219/34013; G05B 2219/39001
USPC ............ 318/560, 568.12, 568.11, 568.1, 567
See application file for complete search history.

(56) References Cited

U.S. PATENT DOCUMENTS 6,548,981 B1 * 4/2003 Ishii ....................... H02K 21/14
                                                              318/473

* cited by examiner

*Primary Examiner* — David Luo
(74) *Attorney, Agent, or Firm* — Cozen O'Connor (57) ABSTRACT

A servo motor includes a housing, a rotor, a stator, a planetary reduction mechanism, a first Hall magnet, Hall switches, a second Hall magnet, and a position sensor; the rotor, stator, the planetary reduction mechanism, and the position senor are arranged in the housing. The rotor has a rotor support and a rotor shaft; the planetary reduction mechanism includes a sun gear, a planetary carrier, and planetary gears; a reduction ratio of the planetary reduction mechanism is N:1, where N is a positive integer; the first Hall magnet is arranged on the planetary carrier; the Hall switches correspond to the first Hall magnet and are arranged in the housing at even intervals around a rotation axis of the rotor shaft. The number of Hall switches is N; the second Hall magnet is arranged on the rotor; and the position sensor is opposite the second Hall magnet.

20 Claims, 11 Drawing Sheets

ROBOT AND ITS SERVO MOTOR

CROSS-REFERENCE TO RELATED APPLICATIONS

The present disclosure is based on and claims priority to Chinese Patent Application No. 202120117227.X, filed Jan. 15, 2021, the entire contents of which are incorporated herein by reference.

TECHNICAL FIELD

The present disclosure relates to the field of robot technologies, and in particular, to a servo motor and a robot having the servo motor.

BACKGROUND

Servo motors are commonly used drive devices for footed robots (also known as legged robots) and used to drive a leg assembly of the robot so that the footed robot can move. In related art, in order to control the movement of the leg assembly, a position sensor and a magnet are usually utilized to detect a relative position of a stator and a rotor, but an absolute position of the motor output cannot be detected. Consequently, robot control accuracy is relatively low in the art.

SUMMARY

A servo motor according to embodiments of the present disclosure includes: a housing; a rotor arranged in the housing and having a rotor support and a rotor shaft; a stator arranged in the housing; a planetary reduction mechanism arranged in the housing and including a sun gear, a planetary carrier, and a plurality of planetary gears, a reduction ratio of the planetary reduction mechanism being N:1, where N is a positive integer; a first Hall magnet arranged on the planetary carrier; a plurality of Hall switches corresponding to the first Hall magnet and arranged in the housing at even intervals around a rotation axis of the rotor shaft, wherein a number of Hall switches is N; a second Hall magnet arranged on the rotor; and a position sensor arranged in the housing and opposite the second Hall magnet.

A robot according to embodiments of the present disclosure includes a body assembly; and a leg assembly rotatably connected to the body assembly. The leg assembly including a first leg, a second leg, a servo motor, an output flange and a transmission component. The servo motor includes a housing; a rotor arranged in the housing and having a rotor support and a rotor shaft; a stator arranged in the housing; a planetary reduction mechanism arranged in the housing and including a sun gear, a planetary carrier, and a plurality of planetary gears, a reduction ratio of the planetary reduction mechanism being N:1, where N is a positive integer; a first Hall magnet arranged on the planetary carrier; a plurality of Hall switches corresponding to the first Hall magnet and arranged in the housing at even intervals around a rotation axis of the rotor shaft, wherein a number of Hall switches is N; a second Hall magnet arranged on the rotor; and a position sensor arranged in the housing and opposite the second Hall magnet. The servo motor is arranged at a first end of the first leg, and the motor output shaft of the servo motor is connected to the output flange to drive the output flange to rotate, the first leg is pivotally connected to the second leg, the transmission component is connected to the output flange and the second leg to drive the second leg to rotate relative to the first leg, the output flange is provided with a first limit portion, the first leg is provided with a first stop portion and a second stop portion, and the first stop portion and the second stop portion are spaced apart to limit a rotation angle of the output flange by stopping the first limit portion.

DETAILED DESCRIPTION

Embodiments of the present disclosure are described in detail below and examples of the embodiments are illustrated in the accompanying drawings. The embodiments described below with reference to the drawings are exemplary, and are intended to explain the present disclosure, but should not be understood as a limitation on the present disclosure.

A servo motor and a robot having the servo motor according to embodiments of the present disclosure will be described below with reference to the accompanying drawings.

According to the servo motor of embodiments of the present disclosure, the first Hall magnet rotates with the planetary carrier to activate the Hall switch in a corresponding position, so that a rotation position of the rotor can be detected. In addition, the rotation of the rotor can drive the second Hall magnet on the rotor to rotate, and a rotation angle of the second Hall magnet can be obtained by the position sensor and then a rotation angle of the motor can be obtained, improving the detection accuracy of the servo motor.

First, the servo motor according to embodiments of the present disclosure will be described with reference to the accompanying drawings. As illustrated in FIGS. 1 to 5, the servo motor 5 according to the embodiments of the present disclosure includes a housing 51, a rotor 52, a stator 53, a planetary reduction mechanism 58, a first Hall magnet 54, a Hall switch 551, a second Hall magnet 56, and a position sensor 571. The rotor 52 is arranged in the housing 51 and has a rotor support 521 and a rotor shaft 522. The planetary reduction mechanism 58 is arranged in the housing 51 and includes a sun gear 581, a planetary carrier 583, and a plurality of planetary gears 585. A reduction ratio of the planetary reduction mechanism 58 is N:1, where N is a positive integer.

Figure 3:
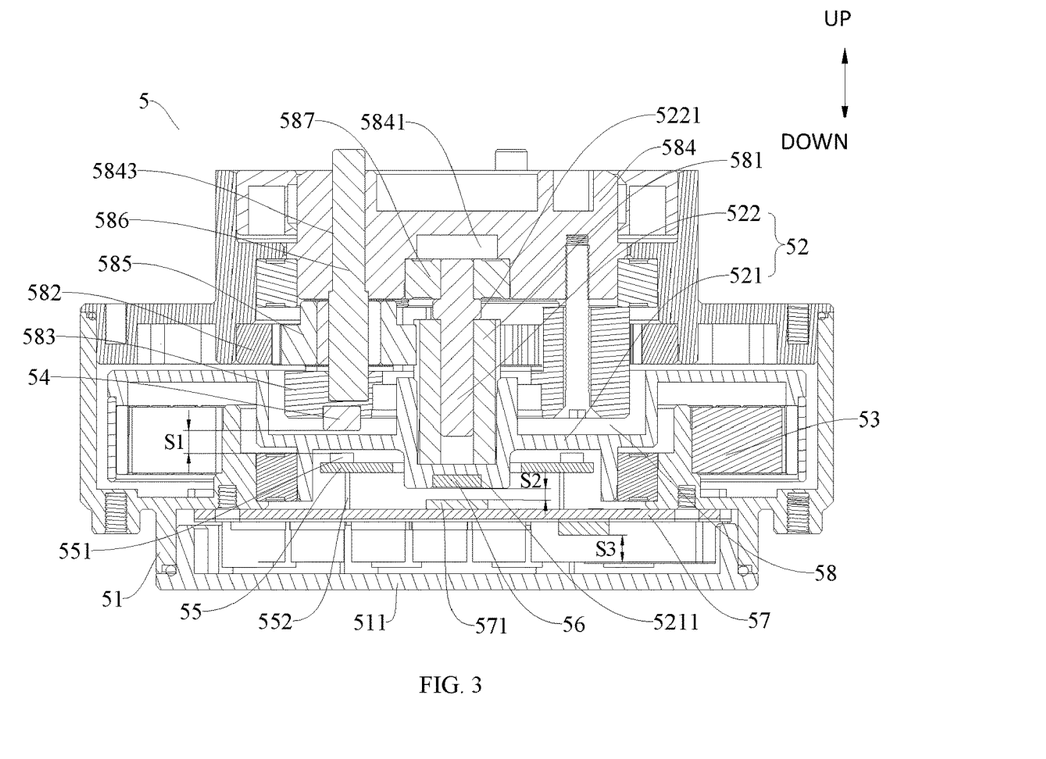
FIG. 3 is a cross-sectional view of a servo motor according to an embodiment of the present disclosure.

As illustrated in FIG. 3, the first Hall magnet 54 is arranged on the planetary carrier 583, and a plurality of Hall switches 551 are provided. The plurality of Hall switches 551 correspond to the first Hall magnet 54 and are arranged in the housing 51 at even intervals around a rotation axis of the rotor shaft 522, and a number of the Hall switches 551 is N. The second hall magnet 56 is arranged on the rotor 52, the position sensor 571 is arranged in the housing 51, and the position sensor 571 faces the second hall magnet 56; one first hall magnet 54 may be provided.

According to the research of inventors of the present disclosure, the reduction ratio of the planetary reduction mechanism 58 is N and the number of Hall switches 551 is N too. That is, when the number of the Hall switches 551 is the same as the value of the reduction ratio of the planetary reduction mechanism 58, the detection accuracy of the servo motor 5 can be improved. When the first Hall magnet 54 rotates with the planetary carrier 583 to a certain position, the first Hall magnet 54 will activate the Hall switch 551 in a corresponding position, so that the rotation position of the rotor 52 can be detected. In addition, the rotation of the rotor 52 can drive the second Hall magnet 56 on the rotor 52 to rotate, and a rotation angle of the second Hall magnet 56 can be obtained by the position sensor 571 to obtain a position of the rotor 52 and a rotation angle of the rotor 52.

In some embodiments, in the embodiment illustrated in FIG. 3, three planetary gears 585 are provided. The planetary gears 585 mesh with the sun gear 581 and an inner gear ring 582, and the sun gear 581 is coaxially connected with the rotor shaft 522, for example, the sun gear 581 is fitter over the rotor shaft 522. Planetary shafts 586 of the plurality of planetary gears 585 are connected to the planetary carrier 583 and a motor output shaft 584. It can be understood that when the servo motor 5 works, the rotor 52 drives the sun gear 581 to rotate, the sun gear 581 drives the planetary gears 585 and the planetary shafts 586 to rotate, and the planetary shafts 586 drive the planetary carrier 583 and the motor output shaft 584 to rotate.

In some embodiments, as illustrated in FIG. 3, the servo motor 5 further includes a Hall switch board 55 and a support frame 552, the support frame 552 is arranged in the housing 51, the Hall switch board 55 is mounted on the support frame 552, and the plurality of Hall switches 551 are arranged on the Hall switch board 55. The support frame 552 is configured to support the Hall switch board 55 so that the Hall switch board 55 and the housing 51 are relatively fixed.

Figure 5:
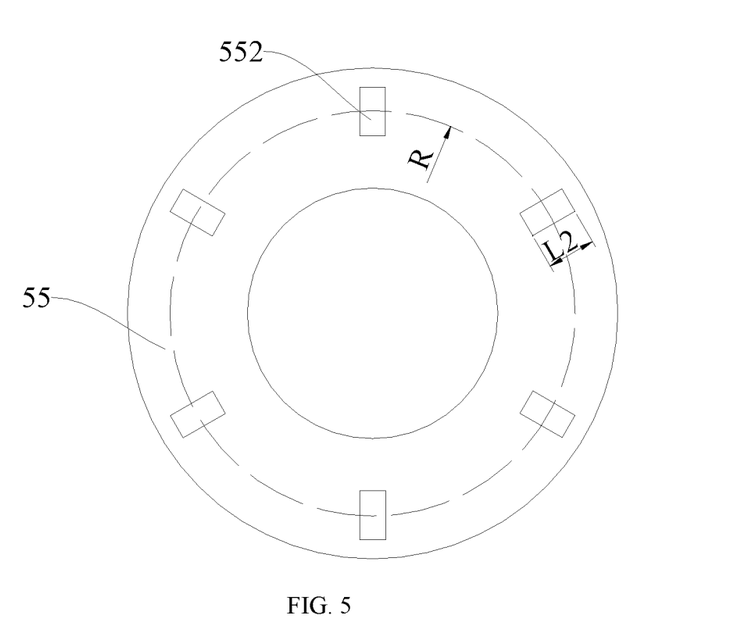
FIG. 5 is a schematic diagram of installation of a Hall switch board and Hall switches of a servo motor according to an embodiment of the present disclosure.

In at least one embodiment, as illustrated in FIGS. 3 and 5, the Hall switch board 55 is annular, and a center hole of the Hall switch board 55 is in clearance fit with the rotor 52, that is, the rotor 52 and the Hall switch board 55 are not in contact. The plurality of Hall switches 551 are evenly arranged on the Hall switch board 55 along its circumferential direction, and the Hall switches 551 are located on a side of the Hall switch board 55 close to the planetary carrier 583.

For example, as illustrated in FIGS. 3 and 5, the reduction ratio of the planetary reduction mechanism 58 is 6:1, and six Hall switches 551 are provided and evenly arranged on the Hall switch board 55 along its circumferential direction. One first Hall magnet 54 is provided and arranged on an end of the planetary carrier 583 close to the Hall switch board 55. When the first Hall magnet 54 rotates to be right above a corresponding Hall switch 551, the Hall switch 551 at the corresponding position will be activated, obtaining a rotation position of the rotor 52.

Figure 4:
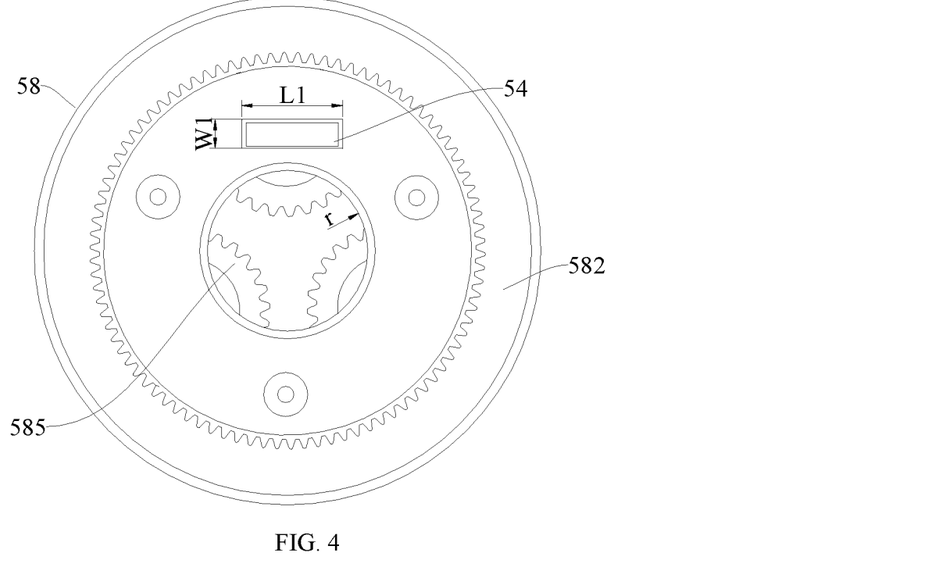
FIG. 4 is a schematic diagram of installation of a planetary reduction mechanism of a servo motor and a first Hall magnet according to an embodiment of the present disclosure.

In some embodiments, as illustrated in FIGS. 3 to 5, an inner radius of the planetary carrier 583 is r, and a radius of the sun gear 581 is R1, where R1+2 mm ≤ r ≤ R1+5 mm. The plurality of Hall switches 551 are arranged in a circle around the rotor shaft 522, and R refers to a radius of a circle where the centers of the plurality of Hall switches 551 are located, where R1+5 mm ≤ t ≤ R1+12 mm. According to the research of the inventors of the present disclosure, by limiting the sizes of the planetary carrier 583 and the sun gear 581 and the positions of the Hall switches 551 to the above numerical ranges, the detection accuracy of the servo motor 5 can be further improved, and the servo motor 5 can operate more stably.

In at least one embodiment, as illustrated in FIG. 4, the first Hall magnet 54 and the Hall switch 551 are both substantially rectangular, and a length direction of the first Hall magnet 54 (e.g., a left-right direction of the first Hall magnet 54 in FIG. 4) is orthogonal to a radial direction of the planetary carrier 583, a length of the first Hall magnet 54 is L1, a width of the first Hall magnet 54 is W1, and a length of the Hall switch 551 is L2, where (2πR/N) ≤ L1 ≤ 1.5 (2πR/N) and L2 ≤ W1 ≤ 2L2. According to the research of the inventors of the present disclosure, by limiting the sizes of the first Hall magnet 54 and the Hall switch 551 to the above-mentioned numerical ranges, the first Hall magnet 54 can activate one to two Hall switches 511 while rotating, improving the reliability of detection.

In some embodiments, as illustrated in FIG. 3, S1 refers to a distance between the first Hall magnet 54 and the Hall switch 551, and 2 mm ≤ S1 ≤ 6 mm. According to the research of the inventors of the present disclosure, setting the distance S1 between the first Hall magnet 54 and the Hall switch 551 within the range of 2 mm to 6 mm can not only ensure the detection accuracy, but also improve the utilization rate of space inside the servo motor 5, to reduce the size of the servo motor 5. According to the experimental research of the inventors, if S1 is less than 2 mm, the detection accuracy is reduced; and if S1 is greater than 6 mm, the distance between the first Hall magnet 54 and the Hall switch 551 becomes too large, which increases the space required inside the servo motor 5.

Further, as illustrated in FIG. 3, S2 refers to a distance between the second Hall magnet 56 and the position sensor 571, and 1 mm ≤ S2 ≤ 3 mm. According to the research of the inventors, setting the distance S2 between the second Hall magnet 56 and the position sensor 571 within the range of 1 mm to 3 mm can not only ensure the detection accuracy, but also improve the utilization rate of space inside the servo motor 5, to reduce the size of the servo motor 5. According to the experimental research of the inventors, if S2 is less than 1 mm, the detection accuracy is reduced; and if S2 is greater than 3 mm, the distance between the second Hall magnet 56 and the position sensor 571 becomes too large, which increases the space required inside the servo motor 5.

In some embodiments, as illustrated in FIG. 3, the servo motor 5 further includes a printed circuit board 57, the printed circuit board 57 is arranged in the housing 51, and the position sensor 571 is arranged on the printed circuit board 57. Since the servo motor 5 includes one printed circuit board 57, electronic components such as the position sensor 571 are integrated on the one printed circuit board 57, to improve the utilization rate of space inside the servo motor 5, reduce the size of the servo motor 5, and facilitate the miniaturization of the motor.

In some embodiments, as illustrated in FIG. 3, the printed circuit board 57 is arranged at a rear part in the housing 51; S3 refers to a minimum distance between the printed circuit board 57 and a rear end cover 511 of the housing 51, and 4 mm $\leq$ S3 $\leq$ 8 mm. Here, it should be understood that the minimum distance refers to a distance between the rear end cover 511 and a part or element on the printed circuit board 57 closest to the rear end cover 511.

As illustrated in FIG. 3, the printed circuit board 57 is arranged between the rear end cover 511 of the housing 51 and the rotor support 521, and the minimum distance between the printed circuit board 57 and the rear end cover 511 of the housing 51 is S3. By setting the minimum distance S3 within the above range, the risk of collision with and damage to the electronic components on the printed circuit board 57 due to the deformation of the rear end cover 511 can be reduced and the overall size of the servo motor 5 is reduced, which further facilitates the miniaturization of the servo motor 5; in the meanwhile, the space between the rear end cover 511 and the printed circuit board 57 can also serve as heat dissipation space, which is beneficial to the heat dissipation of the printed circuit board 57. If S3 is too small, the components on the printed circuit board 57 are prone to damage and heat dissipation is affected. If S3 is too large, it is adverse to the miniaturization of the servo motor 5.

In some embodiments, a surface of the printed circuit board 57 facing the stator 53 and a surface of the printed circuit board 57 away from the stator 53 are each provided with an electronic component, and the position sensor 571 is arranged on the surface of the printed circuit board 57 facing the stator 53. The electronic component arranged on the surface of the printed circuit board 57 facing the stator 53 generates less heat than the electronic component arranged on the surface of the printed circuit board 57 away from the stator 53.

As illustrated in FIG. 3, the electronic component arranged on the upper end face of the printed circuit board 57 generates less heat than the electronic component arranged on the lower end face of the printed circuit board 57, and most of the heat can be led out toward the rear end cover 511, to avoid affecting the position sensor 571, improve the detection accuracy of the position sensor 571, and improve the overall heat dissipation performance of the servo motor 5.

In some embodiments, as illustrated in FIG. 3, the second Hall magnet 56 may be arranged at an end of the rotor shaft 522 facing the position sensor 571. In at least one embodiment, the second Hall magnet 56 may be arranged at a position on the rotor support 521 facing the position sensor 571.

In some embodiments, as illustrated in FIG. 3, the rotor support 521 is coaxially fitted over the rotor shaft 522, and the rotor support 521 and the rotor shaft 522 rotate together. The second Hall magnet 56 is mounted on an end of the rotor support 521 close to the printed circuit board 57, and the second Hall magnet 56 is arranged to face the position sensor 571.

In at least one embodiment, as illustrated in FIG. 3, the second Hall magnet 56 is cylindrical or annular, the rotor support 521 is provided with a mounting groove 5211, and the second Hall magnet 56 is arranged in the mounting groove 5211. An outer surface of the second Hall magnet 56 is lower than or flush with an outer surface of the mounting groove 5211. For example, the second Hall magnet 56 can be fixed in the mounting groove 5211 by gluing.

Figure 6:
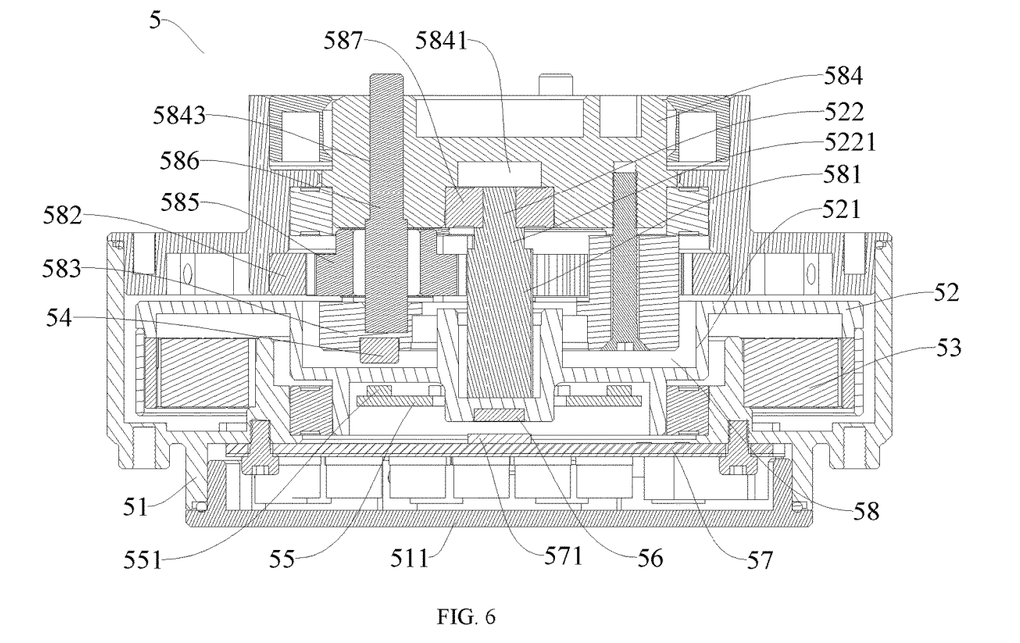
FIG. 6 is a cross-sectional view of a servo motor according to another embodiment of the present disclosure.
Figure 8:
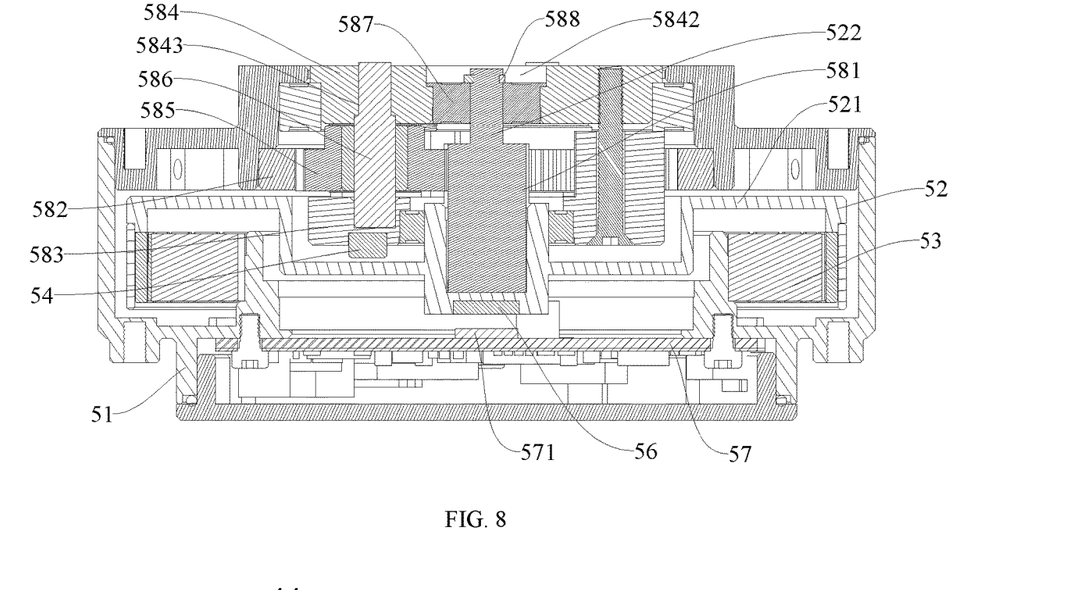
FIG. 8 is a cross-sectional view of a servo motor according to still another embodiment of the present disclosure.

In some embodiments, as illustrated in FIGS. 6 and 8, the rotor shaft 522 and the sun gear 581 are integrally formed. It can be understood that the rotor shaft 522 and the sun gear 581 are of a gear-shaft structure. In the servo motor 5 of the present disclosure, since the rotor shaft 522 and the sun gear 581 are made into an integral structure, the outer diameter of the sun gear 581 can be reduced while ensuring its strength, to reduce the size of the servo motor 5, facilitate the miniaturization design of the servo motor 5, and improve the applicability of the servo motor 5.

Figure 7:
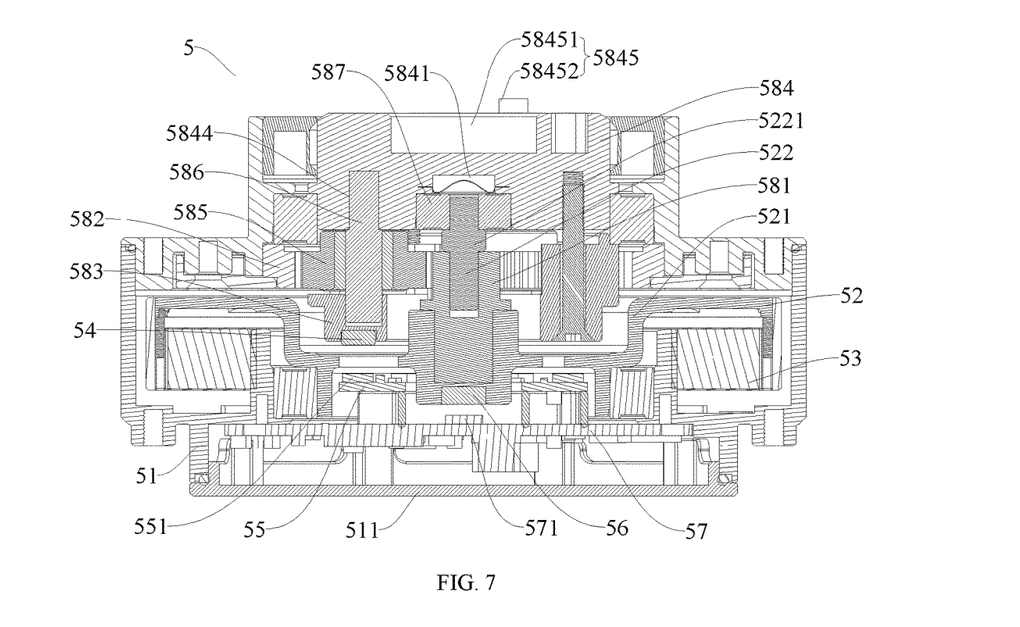
FIG. 7 is a cross-sectional view of a servo motor according to yet another embodiment of the present disclosure.

In some embodiments, as illustrated in FIGS. 3, 6 and 7, the planetary reduction mechanism 58 further includes a rotor bearing 587; an end of the motor output shaft 584 (e.g., a lower end of the motor output shaft 584 in FIG. 3) is provided with a bearing mounting groove 5841, the rotor shaft 522 is provided with a flange 5221, the rotor bearing 587 is fitted over the rotor shaft 522, an end of the rotor bearing 587 (e.g., a lower end of the rotor bearing 587 in FIG. 3) abuts against the flange 5221, and the other end of the rotor bearing 587 (e.g., an upper end of the rotor bearing 587 in FIG. 3) abuts against an inner wall of the bearing mounting groove 5841. It can be understood that since an inner ring of the rotor bearing 587 abuts against the flange 5221, the rotor bearing 587 can be axially positioned; and since an outer ring of the rotor bearing 587 abuts against the inner wall of the bearing mounting groove 5841, the rotor bearing 587 can be further positioned radially, improving the positioning accuracy of the rotor bearing 587. In addition, since the bearing mounting groove 5841 does not penetrate through the motor output shaft 584, the possibility of external dust or sewage entering the servo motor 5 can be reduced to a certain extent, and the waterproof performance of the servo motor 5 is improved.

In at least one embodiment, as illustrated in FIGS. 3 and 7, the rotor shaft 522 and the sun gear 581 are detachably connected, and the sun gear 581 abuts against the flange 5221. It can be understood that the rotor shaft 522 is in an interference fit with the sun gear 581, and an upper end of the sun gear 581 abuts against the flange 5221 to position the sun gear 581 in both axial and radial directions and facilitate the assembly and disassembly of the servo motor 5.

In other embodiments, as illustrated in FIG. 8, the planetary reduction mechanism 58 further includes a rotor bearing 587, a bearing mounting hole 5842 is defined in the motor output shaft 584, the rotor bearing 587 is fitted in the bearing mounting hole 5842, and an end of the rotor shaft 522 (e.g., an upper end of the rotor shaft 522 in FIG. 8) protrudes from the rotor bearing 587 and is engaged by a circlip 588. It can be understood that the bearing mounting hole 5842 penetrates through the motor output shaft 584 along the axial direction of the motor output shaft 584. The bearing mounting hole 5842 is configured as a stepped hole. The outer ring of the rotor bearing 587 abuts against the bearing mounting hole 5842 and is in an interference fit with the bearing mounting hole 5842. The rotor shaft 522 is in an interference fit with the rotor bearing 587, and the upper end of the rotor shaft 522 protrudes upward from the inner ring of the rotor bearing 587. The upper end of the rotor shaft 522 has a snap groove in which the circlip 588 is engaged for positioning the rotor shaft 522, avoiding axial displacement between the rotor shaft 522 and the rotor bearing 587.

In some embodiments, as illustrated in FIGS. 3, 6 and 8, a plurality of fitting holes 5843 penetrate through the motor output shaft 584, the plurality of fitting holes 5843 are in one-to-one correspondence with the plurality of planetary shafts 586, and ends of at least part of the planetary shafts 586 protrude through the fitting holes 5843. For example, three planetary shafts 586 and three fitting holes 5843 are provided. The three planetary shafts 586 are spaced apart along the circumferential direction of the sun gear 581, and the upper ends of the three planetary shafts 586 respectively protrude through the three fitting holes 5843. It can be understood that the portion of the planetary shaft 586 protruding through the fitting hole 5843 constitutes a positioning portion 5845 to perform positioning when other components are assembled with the servo motor 5, thus improving the assembly efficiency.

In other embodiments, as illustrated in FIG. 7, an end of the motor output shaft 584 (e.g., a lower end of the motor output shaft 584 in FIG. 7) is provided with a plurality of fitting grooves 5844, the plurality of fitting grooves 5844 are in one-to-one correspondence with the plurality of planetary shafts 586, and an end of the planetary shaft 586 (e.g., an upper end of the planetary shaft 586 in FIG. 7) is fitted in the fitting groove 5844. For example, three planetary shafts 586 and three fitting grooves 5844 are provided. The three planetary shafts 586 are spaced apart along a circumferential direction of the sun gear 581. The upper ends of the three planetary shafts 586 are respectively mounted in the three fitting grooves 5844. It is understood that since the fitting grooves 5844 do not penetrate through the motor output shaft 584, the possibility of external dust or sewage entering the servo motor 5 can be reduced to a certain extent, improving the waterproof performance of the servo motor 5. In at least one embodiment, the planetary shafts 586 are in clearance fit with the fitting grooves 5844 to facilitate the assembly of the planetary shafts 586 and the motor output shaft 584.

Figure 2A:
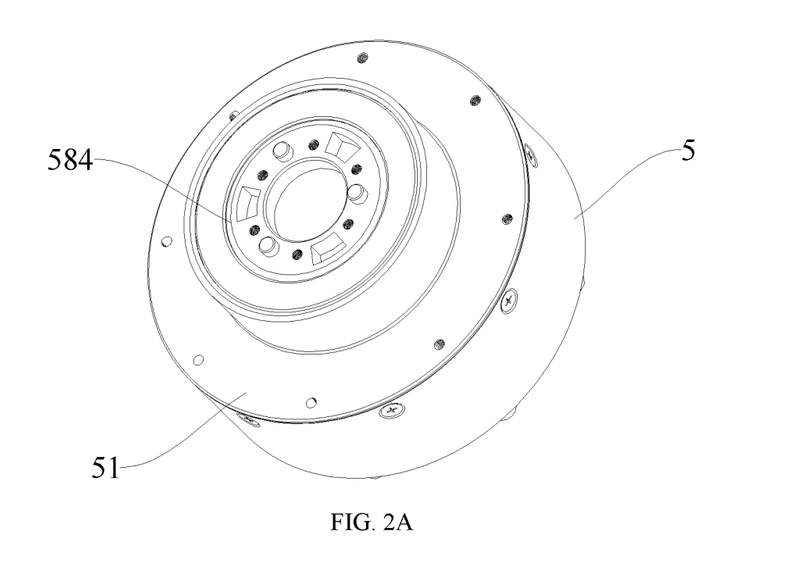
FIG. 2A is a schematic diagram of a servo motor according to an embodiment of the present disclosure.
Figure 2B:
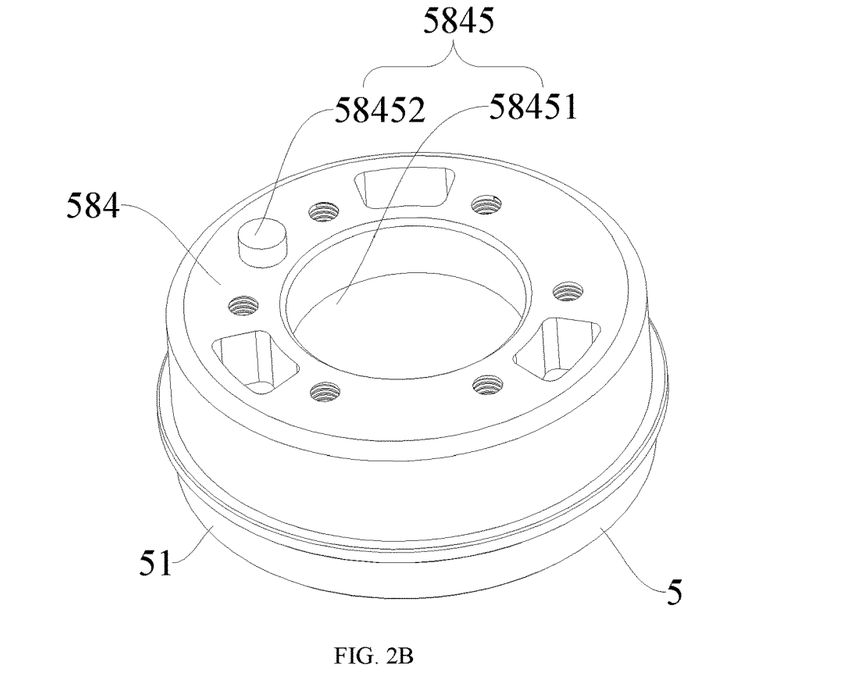
FIG. 2B is a schematic diagram of a servo motor according to another embodiment of the present disclosure.

Further, as illustrated in FIGS. 2B and 7, the other end of the motor output shaft 584 (e.g., an upper end of the motor output shaft 584 in FIG. 7) is provided with a positioning portion 5845. The positioning portion 5845 includes a first positioning portion 58451 and a second positioning portion 58452. The first positioning portion 58451 and the second positioning portion 58452 are spaced apart in the radial direction of the motor output shaft 584, and the first positioning portion 58451 is arranged coaxially with the motor output shaft 584. For example, the first positioning portion 58451 is configured as a positioning groove, and the second positioning portion 58452 is configured as a positioning post. It can be understood that when the motor output shaft 584 of the servo motor 5 is assembled with other components, the components can be positioned radially and axially through the first positioning portion 58451 and the second positioning portion 58452, improving assembly efficiency.

A robot according to embodiments of the present disclosure will be described below with reference to the accompanying drawings.

The robot according to embodiments of the present disclosure can control the rotation of the leg assembly through the servo motor, and then can detect the rotation angle and the moving position of the leg assembly, improving the movement accuracy of the robot.

Figure 1:
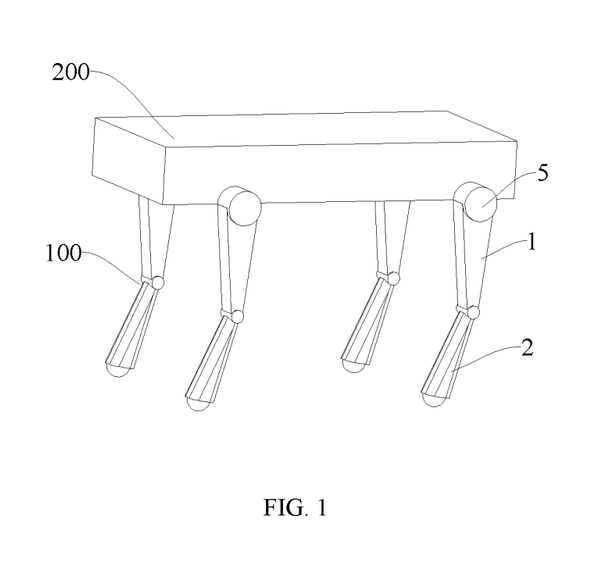
FIG. 1 is a schematic diagram of a robot according to an embodiment of the present disclosure.

As illustrated in FIG. 1, the robot according to embodiments of the present disclosure includes a body assembly 200 and a plurality of leg assemblies 100. In the embodiment illustrated in FIG. 1, four leg assemblies 100 are provided. Therefore, the robot can be called a four-footed robot or a four-legged robot. It can be understood that the present disclosure is not limited to this. For example, the robot may also include two leg assemblies 100, and accordingly the robot may be called a two-footed robot or a two-legged robot. In the embodiment illustrated in FIG. 1, the four leg assemblies 100 are connected to the body assembly 200 to support the body assembly 200. When the leg assembly 100 works, the robot's walking and other actions can be realized.

The leg assembly 100 is rotatably connected to the body assembly 200, and the leg assembly 100 includes a first leg 1, a second leg 2, a servo motor 5, an output flange 4 and a transmission component 3. It can be understood that the first leg 1 can also be referred to as a thigh, and the second leg 2 can also be referred to as a calf. The first leg 1 may be pivotally connected to the body assembly 200 of the robot.

The servo motor 5 is arranged at a first end of the first leg 1 (e.g., an upper end of the first leg 1 in FIG. 1). The motor output shaft 584 of the servo motor 5 is connected to the output flange 4 to drive the output flange 4 to rotate. The leg 1 and the second leg 2 are pivotally connected, and the transmission component 3 is connected with the output flange 4 and the second leg 2 to drive the second leg 2 to rotate relative to the first leg 1.

Figure 9:
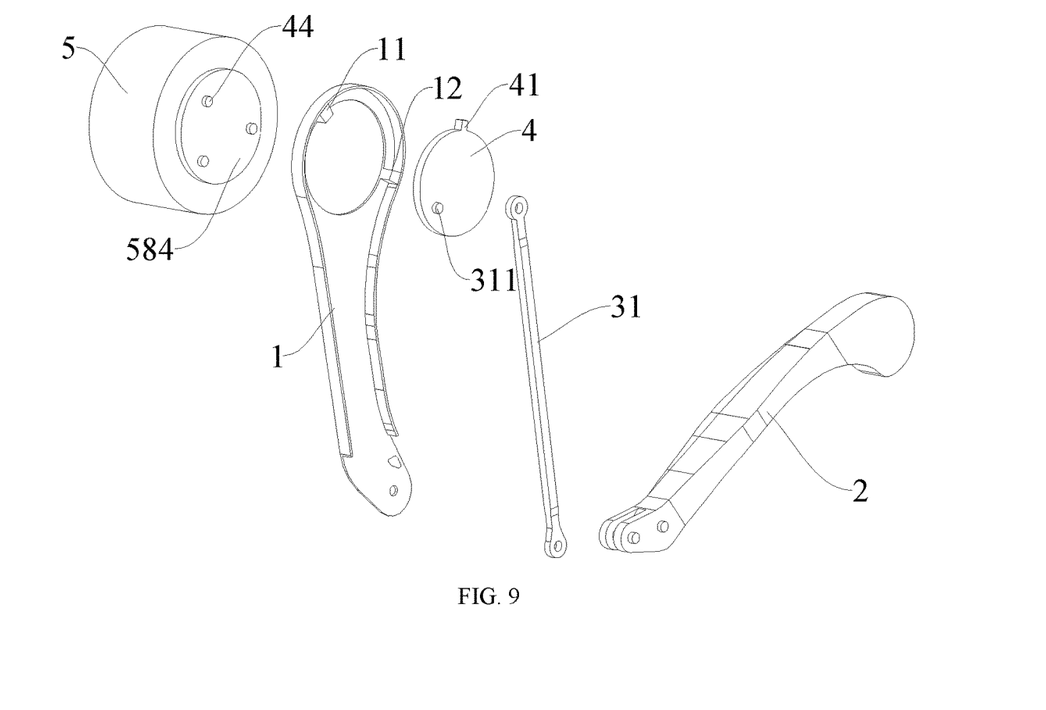
FIG. 9 is an exploded view of a leg assembly of a robot according to an embodiment of the present disclosure.
Figure 10:
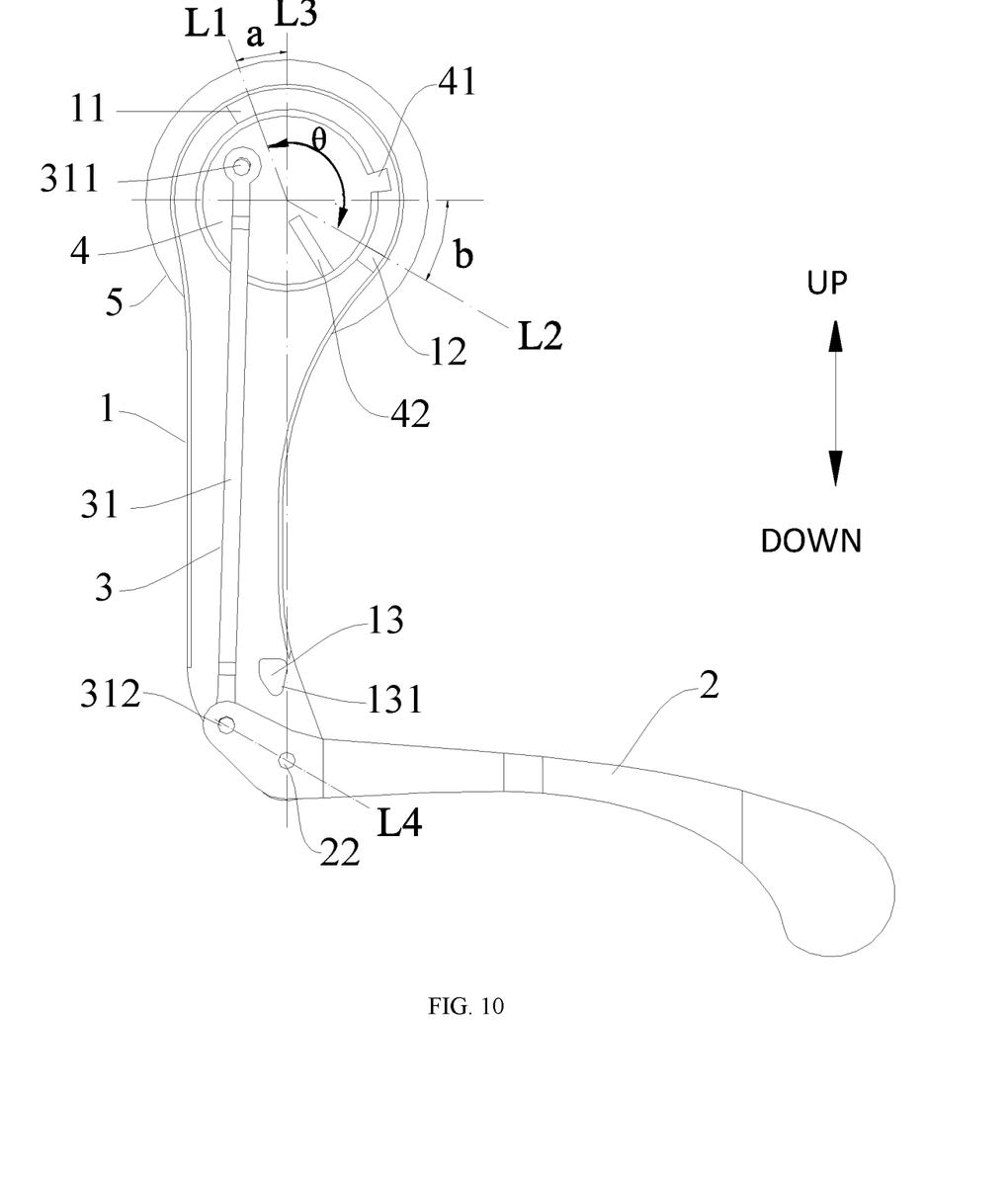
FIG. 10 is a schematic diagram of a leg assembly of a robot according to an embodiment of the present disclosure.
Figure 11:
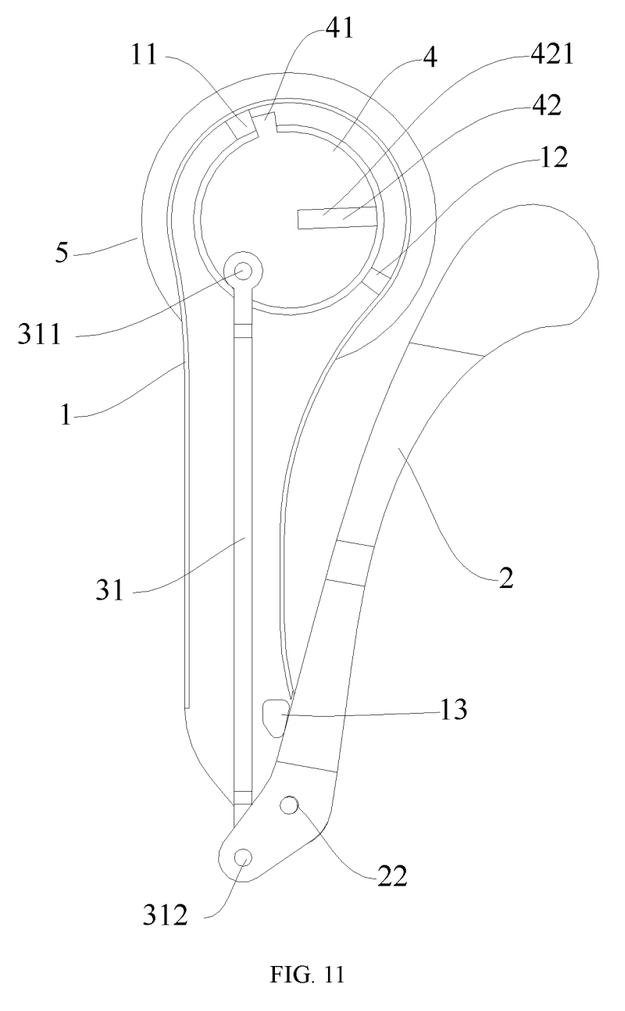
FIG. 11 is a schematic diagram of a leg assembly of a robot according to an embodiment of the present disclosure, where a second leg is in a folding limit position.

As illustrated in FIGS. 9 to 11, the output flange 4 is provided with a first limit portion 41. The first leg 1 is provided with a first stop portion 11 and a second stop portion 12, and the first stop portion 11 and the second stop portion 12 are spaced apart along a circumferential direction of the output flange 4. The first stop portion 11 and the second stop portion 12 can limit a rotation angle of the output flange 4 by stopping the first limit portion 41, to limit a rotation range of the second leg 2 relative to the first leg 1 and an unfolding limit position and a folding limit position of the second leg 2.

In other words, the first stop portion 11 and the second stop portion 12 respectively define rotation limit positions of the first limit portion 41. When the first limit portion 41 is stopped by the first stop portion 11 or the second stop portion 12, further rotation of the output flange 4 is stopped, that is, further rotation of the servo motor 5 is stopped.

Figure 12:
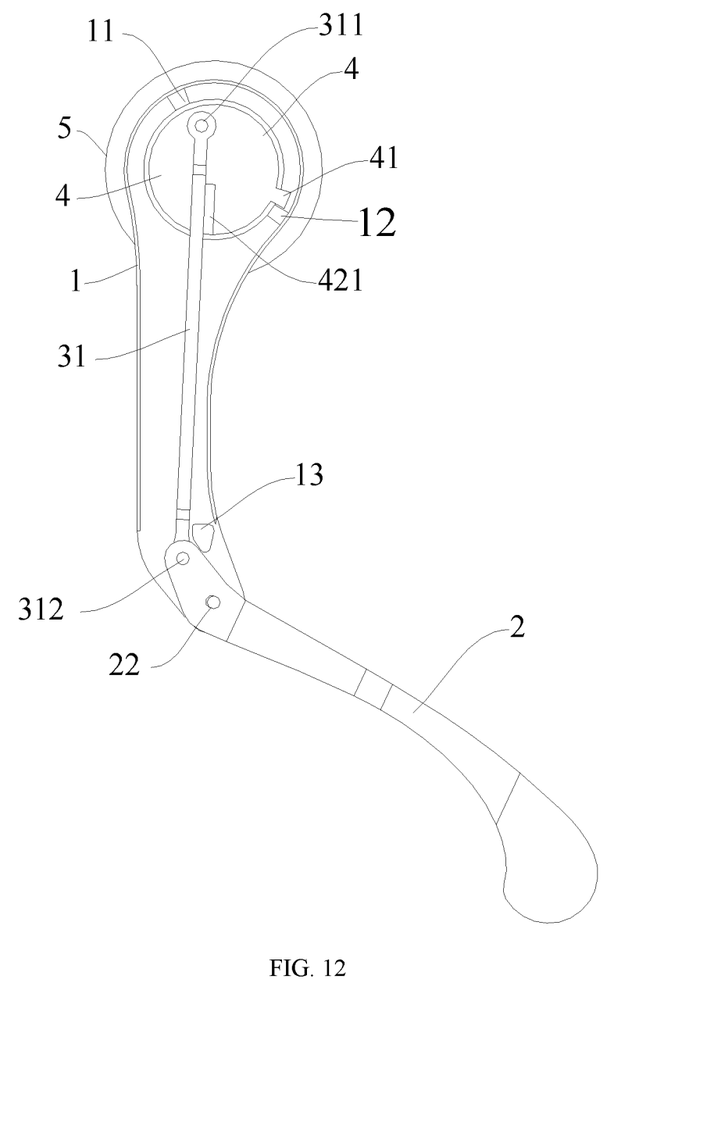
FIG. 12 is a schematic diagram of a leg assembly of a robot according to an embodiment of the present disclosure, where a second leg is in an unfolding limit position.

For example, as illustrated in FIGS. 10 to 12, when the output flange 4 rotates clockwise from a position illustrated in FIG. 10, after the first limit portion 41 comes into contact with the second stop portion 12 on the first leg 1, the second stop portion 12 stops the output flange 4 from further rotating clockwise, as illustrated in FIG. 12, that is, the output flange 4 reaches a clockwise rotation limit position, so that the second leg 2 rotates to the unfolding limit position. Conversely, when the output flange 4 rotates counterclockwise from a position illustrated in FIG. 10, after the first limit portion 41 comes into contact with the first stop portion 11 on the first leg 1, the first stop portion 11 stops the output flange 4 from further rotating counterclockwise, as illustrated in FIG. 11, that is, the output flange 4 reaches a counterclockwise rotation limit position, so that the second leg 2 rotates to the folding limit position.

A second limit portion 13 is arranged on the first leg 1 and configured to stop the second leg 2 to limit the rotation of the second leg 2. As illustrated in FIG. 11, when the second leg 2 moves to the folding limit position, the second limit portion 13 stops the second leg 2, and at the same time, the first stop portion 11 stops the first limit portion 41.

In the robot according to the embodiment of the present disclosure, by arranging the first stop portion 11 and the second stop portion 12 on the first leg 1, the rotation angle range of the output flange 4 can be conveniently limited, facilitating the control over the rotation range of the second leg 2, i.e., the unfolding limit position and the closing limit position, and further accurately controlling the operation of the second leg 2. Moreover, since the second limit portion 13 is arranged on the first leg 1, when the first limit portion 41 is stopped by the first stop portion 11, the second leg 2 that moves to the folding limit position is stopped by the second limit portion 13, preventing the second leg 2 from colliding with the first leg 1. As a result, the rotation of the output flange 4 can be conveniently limited within a predetermined angle range, and at the same time, the second leg 2 that moves to the folding limit position is limited by the second limit portion 13, improving the limit reliability; moreover, stress and impact on various members of the leg assembly 100 are reduced, which reduces noise and facilitates accurate control of the leg assembly 100.

As illustrated in FIGS. 10 to 12, the output flange 4 is configured as a disc and coaxially connected with the motor output shaft 584 of the servo motor 5. The first limit portion 41 is arranged on an outer peripheral wall of the output flange 4, and the first stop portion 11 and the second stop portion 12 are arranged at the upper end of the first leg 1 along the circumferential direction of the output flange 4.

In the embodiments illustrated in FIGS. 10 to 12, the first limit portion 41, the first stop portion 11 and the second stop portion 12 are all rectangular blocks, so that the first limit portion 41 is in surface contact with the first stop portion 11 and the second stop portion 12, thus achieving more even stress and smaller compact. In at least one embodiment, a surface of the first stop portion 11 and a surface of the second stop portion 12 and/or a surface of the first limit portion 41 are covered with a buffer layer, such as an elastic rubber layer, to further reduce the impact when the first limit portion 41 comes into contact with the first stop portion 11 and the second stop portion 12. Further in at least one embodiment, tapered grooves may be defined in the surfaces of the first stop portion 11 and the second stop portion 12 in contact with the first limit portion 41, and the first limit portion 41 is provided with a tapered protrusion. In this way, when the first limit portion 41 comes into contact with the first stop portion 11 or the second stop portion 12, the tapered protrusion gradually enters the tapered groove, further increasing the smoothness of the contact and reducing the impact. More advantageously, a surface of the tapered groove and/or a surface of the tapered protrusion may be covered with an elastic material layer to further reduce the impact.

Figure 16:
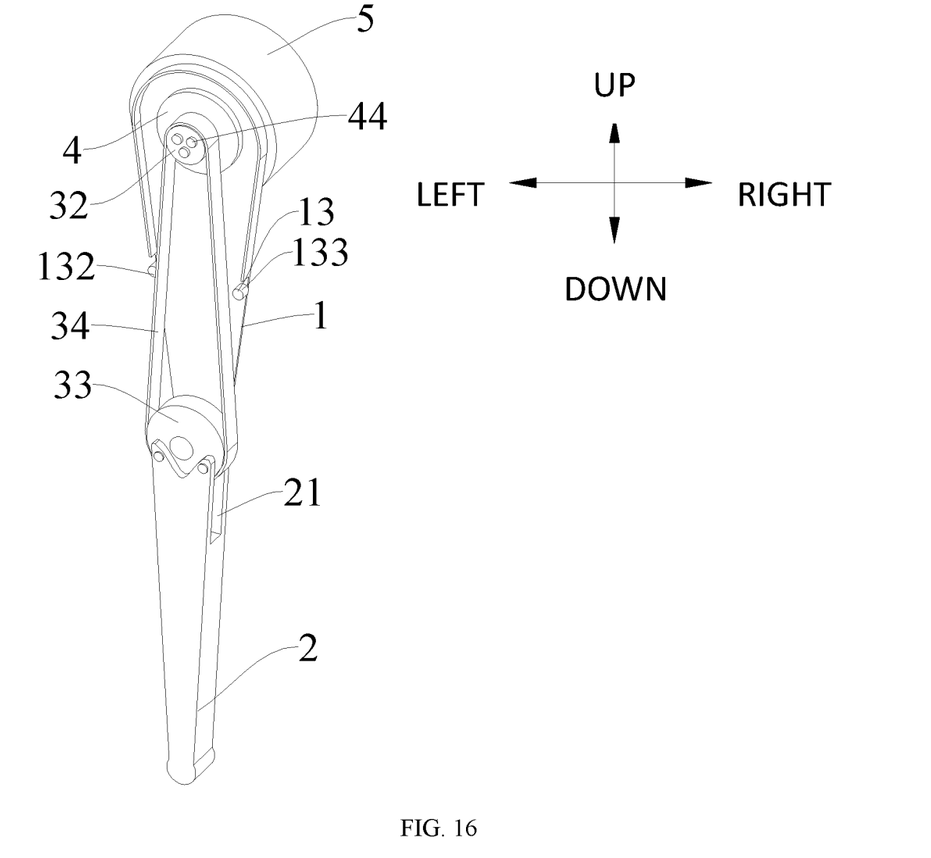
FIG. 16 is a schematic diagram of a leg assembly of a robot according to yet another embodiment of the present disclosure.

In some embodiments, as illustrated in FIGS. 10 to 12, the second limit portion 13 is configured as a limit block suitable for surface contact with the second leg 2. In at least one embodiment, the second limit portion 13 may also be configured as a limit post suitable for line contact with the second leg 2, as illustrated in FIG. 16.

In some embodiments, the second limit portion 13 is configured as a limit block suitable for surface contact with the second leg 2, which can further reduce the stress and impact on the leg assembly 100 and increase the service life of the leg assembly 100.

In some embodiments, as illustrated in FIG. 11, the second limit portion 13 can limit the counterclockwise rotation of the second leg 2 and the height of the leg assembly 100 is further limited when the robot stands up, improving the applicability of the leg assembly 100 and facilitating the design of the robot.

In some embodiments, as illustrated in FIGS. 10 to 12, a third limit portion 42 is arranged on the output flange 4 and configured to stop the transmission component 3 to limit the rotation of the second leg 2.

In at least one embodiment, as illustrated in FIGS. 11 and 12, the third limit portion 42 is configured as a protrusion 421 arranged on the surface of the output flange 4. As illustrated in FIG. 12, when the output flange 4 rotates clockwise and the second leg 2 rotates clockwise to the unfolding limit position, the transmission component 3 comes into contact with the third limit portion 42 to stop the movement of the transmission component 3, limiting the rotation of the output flange 4, the servo motor 5 and the second leg 2; the protrusion 421 rotates clockwise together with the output flange 4 and stops the transmission component 3 and the movement of the second leg 2 is further limited, thus further improving the limit reliability of the leg assembly 100. Therefore, when the second leg 2 moves to the unfolding limit position and the folding limit position, double limit is realized, which improves the limit reliability.

In some embodiments, as illustrated in FIGS. 9 to 12, the transmission component 3 includes a connecting rod 31, a first end of the connecting rod 31 is pivotally connected to the output flange 4 by a first pivot 3111, a second end of the connecting rod 31 is pivotally connected to a first end of the second leg 2 by a second pivot 312, and a second end of the first leg 1 and the first end of the second leg 2 are pivotally connected by a third pivot 22.

After the servo motor 5 is started, the output flange 4 is driven to rotate, for example, swing, around a center axis of the motor output shaft 584 through the motor output shaft 584 of the servo motor 5. Since the first pivot 311 is eccentrically arranged with respect to the center axis of the motor output shaft 584, the first pivot 311 revolves around the central axis of the motor output shaft 584, and then the first end of the connecting rod 3 is driven to revolve around the central axis of the motor output shaft 584, thus driving the connecting rod 3 to move. Since the second end of the connecting rod 3 is pivotally connected to the first end of the second leg 2 through the second pivot and the first end of the second leg 2 is pivotally connected through the third pivot 22, the connecting rod 3 drives the second leg 2 to rotate around the third pivot 22 relative to the first leg 1.

In some embodiments, in FIG. 10, the third pivot 22 is located between the second pivot 312 and a second end of the second leg 2, that is, the third pivot 22 is closer to the second end (a right end in FIG. 10) of the second leg 2 than the second pivot 312. When the output flange 4 rotates clockwise, the connecting rod 3 moves upward and drives the second pivot 312 to move upward, and then the second leg 2 is driven to swing clockwise around the third pivot 22, thus unfolding the second leg 2 relative to the first leg 1. Conversely, when the output flange 4 rotates counterclockwise, the connecting rod 3 moves downward and drives the second pivot 312 to move downward, and then the second leg 2 is driven to swing counterclockwise around the third pivot 22, thus folding the second leg 2 up relative to the first leg 1.

Alternatively, the second pivot 312 may also be located between the third pivot 22 and the second end of the second leg 2, that is, the second pivot 312 is closer to the second end (the right end in FIG. 10) of the second leg 2 than the third pivot 22. In this way, when the output flange 4 rotates clockwise, the second leg 2 is driven to fold up relative to the first leg 1; and when the output flange 4 rotates counterclockwise, the second leg 2 is driven to unfold relative to the first leg 1.

Figure 15:
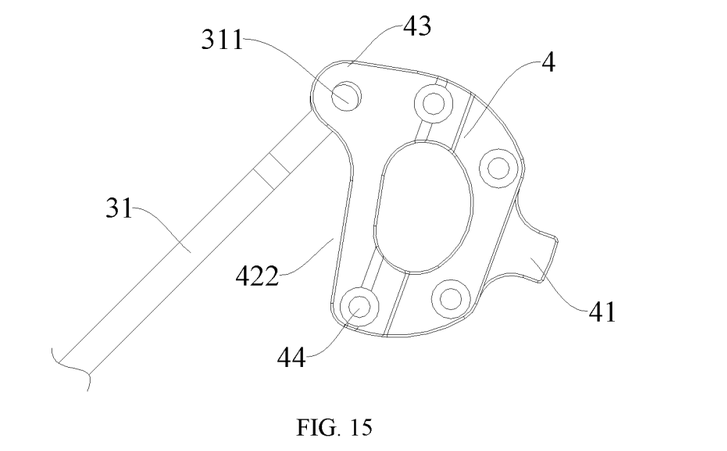
FIG. 15 is a schematic diagram of connection between an output flange and a connecting rod in a leg assembly of a robot according to another embodiment of the present disclosure.

In some embodiments, as illustrated in FIG. 15, the output flange 4 is provided with a recessed portion 422, an end of the recessed portion 422 is provided with a U-shaped fitting groove 43, the first end of the connecting rod 31 is pivotally fitted in the U-shaped fitting groove 43, and a surface of the recessed portion 422 constitutes a third limit portion 42. As illustrated in FIG. 15, when the connecting rod 31 moves, a side wall of the connecting rod 31 can abut against the surface of the recessed portion 422, limiting the rotation of the connecting rod 31, and further limiting the rotation of the output flange 4, the servo motor 5 and the second leg 2; in this way, the limit reliability can be improved, the stress and impact on various members can be reduced, and the movement of the second leg 2 can be accurately controlled.

Figure 13:
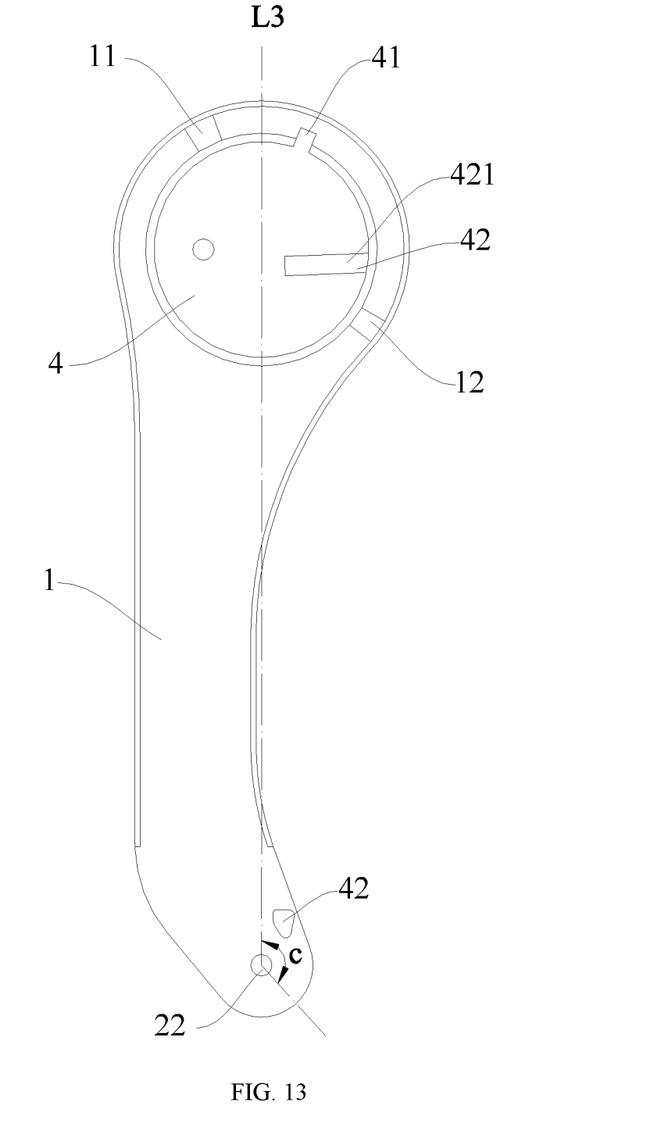
FIG. 13 is a schematic diagram of a first leg and an output flange of a leg assembly of a robot according to an embodiment of the present disclosure.
Figure 14:
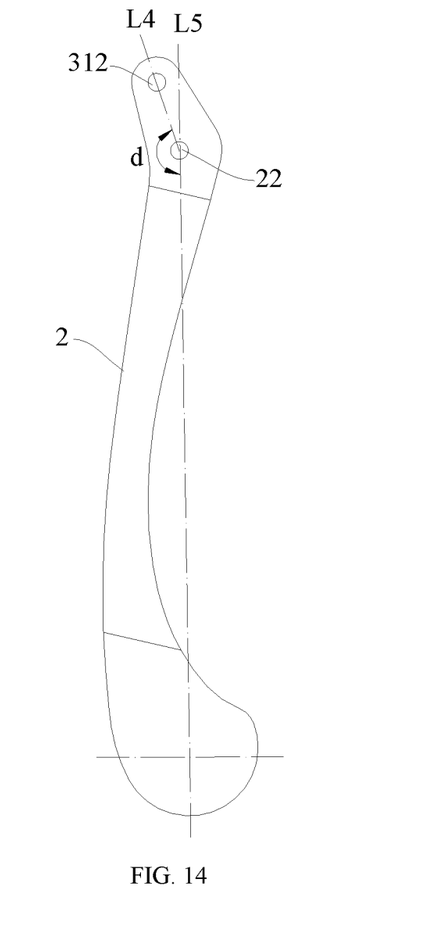
FIG. 14 is a schematic diagram of a second leg of a leg assembly of a robot according to an embodiment of the present disclosure.

Further, as illustrated in FIGS. 10, 13 and 14, L1 refers to a first connecting line between the first stop portion 11 and a center of the motor output shaft 584, L2 refers to a second connecting line between the second stop portion 12 and the center of the motor output shaft 584, and $\theta$ refers to an angle between L1 and L2 and 110 degrees $\leqslant \theta \leqslant$ 160 degrees. In other words, L1 refers to a connecting line between the center of the output flange 4 and a contact surface of the first stop portion 11 for contact with the first limit portion 41, and L2 refers to a connecting line between the center of the output flange 4 and a contact surface of the second stop portion 12 for contact with the first limit portion 41. According to the research of the inventors of the present disclosure, by setting a swing angle of the first limit portion 41 between 110 degrees and 160 degrees, the stress and impact on the leg assembly 100 can be further reduced, and the rotation of the second leg 2 is more stable.

In some embodiments, as illustrated in FIGS. 10, 13 and 14, a refers to an angle between the first connecting line L1 and a third connecting line L3 (between the center of the third pivot 22 and the center of the motor output shaft 584), and 0≤a≤40 degrees. b refers to an angle between the second connecting line L2 and a direction perpendicular to the third connecting line L3, and 10 degrees $\leqslant$ b $\leqslant$ 50 degrees.

As illustrated in FIGS. 11 and 12, the sum of the angle a between the first connecting line L1 and the third connecting line L3 (between the center of the third pivot 22 and the center of the motor output shaft 584) and the angle b between the second connecting line L2 and the direction perpendicular to the third connecting line L3 plus 90 degrees is equal to the angle $\theta$ between the first connecting line L1 (between the first stop portion 11 and the center of the motor output shaft 584) and the second connecting line L2 (between the second stop portion 12 and the center of the motor output shaft 584). According to the research of the inventors of the present disclosure, by limiting the angle a and the angle b within the above ranges, the stress on various members can be further reduced, the impact is smaller, the operation is more stable, and the operation of the second leg 2 can be controlled more accurately.

In some embodiments, as illustrated in FIGS. 10, 13 and 14, c refers to an angle between a length direction of the second end of the first leg 1 and the third connecting line L3, and 130 degrees $\leqslant$ c $\leqslant$ 170 degrees. Further, d refers to an angle between a fourth connecting line L4 (between a center of the second pivot 312 and a center of the third pivot 22) and a fifth connecting line L5 (between the center of the third pivot 22 and the center of the second end (e.g., the lower end of the second leg 2 in FIG. 13) of the second leg 2), and 140 degrees≤d≤180 degrees.

According to the present disclosure, by setting the angle c in the first leg 1 and/or the angle d in the second leg 2 as above, the movement ranges of the first leg and the second leg are relatively wide, their degrees of freedom are good used, interference is avoided, and the first leg 1, the second leg 2 and the connecting rod 3 can move stably.

Further, as illustrated in FIGS. 10, 13 and 14, a distance between the center of the first pivot 3111 and the center of the motor output shaft 584 is less than a distance between the center of the second pivot 312 and the center of the third pivot 22. Based on this design, a swing path of the second leg 2 can be controlled more conveniently, the movement performance of the second leg can be improved, and the movement characteristics of the leg assembly and the robot can be controlled more accurately.

In some embodiments, as illustrated in FIG. 16, the transmission component 3 includes a first wheel 32, a second wheel 33, and a flexible transmission member 34 wound on the first wheel 32 and the second wheel 33. The first wheel 32 is mounted on the output flange 4, the second wheel 33 is rotatably mounted on the second end of the first leg 1, and the first end of the second leg 2 is connected to the second wheel 33.

As illustrated in FIG. 16, the first wheel 32 and the second wheel 33 are configured as pulleys and the flexible transmission member 34 is configured as a transmission belt. In at least one embodiment, the first wheel 32 and the second wheel 33 may be configured as sprockets, and the flexible transmission member 34 may be configured as a chain. The servo motor 5 can drive the first wheel 32 to rotate, the first wheel 32 drives the second wheel 33 to rotate through the flexible transmission member 34, and the second wheel 33 can drive the second leg 2 to rotate.

Further, as illustrated in FIG. 16, the second limit portion 13 includes a left second limit portion 132 and a right second limit portion 133 spaced apart along a width direction of the first leg 1 (e.g., the left-right direction of the first leg 1 in FIG. 11); and the left second limit portion 132 and the right second limit portion 133 are configured to limit the rotation angle of the second leg 2. In some embodiments, the flexible transmission member 34 is located between the left second limit portion 132 and the right second limit portion 133, and the left second limit portion 132 and the right second limit portion 133 are symmetrically arranged relative to a length direction of the first leg 1.

In some embodiments, as illustrated in FIG. 16, the first end of the second leg 2 is provided with a U-shaped groove 21, and a part of the second wheel 33 is located in the U-shaped groove 21. It can be understood that the second wheel 33 is mounted at an upper end of the second leg 2, and the upper end of the second leg 2 is connected with the second wheel 33 by bolts or rivets, so that the second wheel 33 can drive the second leg 2 to rotate.

As illustrated in FIG. 9, the output flange 4 is connected to the motor output shaft 584 through a plurality of pin shafts 44. For example, three pin shafts 44 are provided, and the output flange 4 is fixed to the motor output shaft 584 through the three pin shafts 44, improving the connection strength between the output flange 4 and the motor output shaft 584.

As illustrated in FIG. 1, the robot according to the embodiment of the present disclosure has four leg assemblies 100, and the four leg assemblies 100 are connected to the body assembly 200. It can be understood that the first leg 1 of the leg assembly 100 can be driven by another servo motor to rotate relative to the body assembly 200, and the servo motor 5 drives the second leg 2 to rotate relative to the first leg 1, thus realizing the walking and other actions of the robot. In the robot according to the embodiment of the present disclosure, the limit of the leg assembly 100 is reliable, the stress on various members is small, the impact is small, the noise is low, the operation is stable, and the control accuracy is high.

In the description of the present disclosure, it should be understood that the orientations or positional relationships, indicated by the terms "central", "longitudinal", "lateral", "length", "width", "thickness", "on", "under", "front", "rear", "left", "right", "vertical", "horizontal", "top", "bottom", "inside", "outside", "clockwise", "counterclockwise", "axial", "radial", "circumferential", and the like, are based on the orientations or positional relationships shown in the drawings and are only for the purpose of facilitating and simplifying the description of the present disclosure, rather than indicating or implying that the described device or element must have a particular orientation or must be constructed and operated in a particular orientation, and therefore they cannot to be construed as limiting the present disclosure.

Moreover, the terms "first" and "second" are used for descriptive purposes only and are not to be construed as indicating or implying a relative importance or implicitly indicating the number of technical features indicated. Thus, features defined by the term "first" or "second" may include at least one of the features, either explicitly or implicitly. In the description of the present disclosure, the meaning of "a plurality of" is at least two, such as two, three, etc., unless specifically defined otherwise.

In the present disclosure, unless explicitly stated and defined otherwise, the terms "mounted", "connected with", "connected", "fixed" and the like shall be understood broadly; for example, it may be either a fixed connection or a detachable connection, or in one piece; it may be a mechanical connection, or it may be an electrical connection or a mutual communication; it may be a direct connection or indirect connection through an intermediate medium, and may be an internal communication of two components or an interaction relationship between two components, unless otherwise expressly defined. It will be apparent to those skilled in the art that the specific meanings of the above terms in the utility model can be understood according to the specific conditions.

In the present disclosure, the first feature being "on" or "under" the second feature may mean that the first feature and the second feature are in a direct contact, or the first and second features may be in an indirect contract through an intermediate medium, unless otherwise explicitly stated and defined. Moreover, the first feature being "at the top of", "above" and "on" the second feature may mean that the first feature is right above or above and to one side of the second feature, or may merely mean that the first feature is horizontally higher than the second feature. The first feature being "at the bottom of", "below" and "under" the second feature may mean that the first feature is below or below and to one side of the second feature, or may merely mean that the first feature is horizontally lower than the second feature.

In the description of the present disclosure, the terms "one embodiment", "some embodiments", "example", "specific example", or "some examples" and the like means specific features, structures, materials or characteristics described in connection with the embodiment or example are included in at least one embodiment or example of the present disclosure. In the present specification, the schematic representation of the above terms is not necessarily directed to the same embodiment or example. Furthermore, the specific features, structures, materials, or characteristics described may be combined in a suitable manner in any one or more embodiments or examples. In addition, those skilled in the art can integrate and combine various embodiments or examples described in the present specification, as well as features of various embodiments or examples, without contradicting each other Although the embodiments of the present disclosure have been shown and described, it would be understood that the above-described embodiments are illustrative and are not to be construed as limiting the scope of the present disclosure. Changes, modifications, substitutions and variations of the above-described embodiments may be made by those skilled in the art within the scope of the present disclosure.

What is claimed is:

1. A servo motor, comprising:
a housing;
a rotor arranged in the housing and having a rotor support and a rotor shaft;
a stator arranged in the housing;
a planetary reduction mechanism arranged in the housing and comprising a sun gear, a planetary carrier, and a plurality of planetary gears, a reduction ratio of the planetary reduction mechanism being N:1, wherein N is a positive integer;
a first Hall magnet arranged on the planetary carrier;
a plurality of Hall switches corresponding to the first Hall magnet and arranged in the housing at even intervals around a rotation axis of the rotor shaft, wherein a number of Hall switches is N;
a second Hall magnet arranged on the rotor; and
a position sensor arranged in the housing and opposite the second Hall magnet.

2. The servo motor according to claim 1, further comprising a Hall switch board arranged in the housing and a support frame, the Hall switch board being mounted on the support frame, the plurality of Hall switches being arranged on the Hall switch board.

3. The servo motor according to claim 1, wherein an inner radius of the planetary carrier is r, and a radius of the sun gear is R1, where R1+2 mm≤r≤R1+5 mm.

4. The servo motor according to claim 3, wherein the plurality of Hall switches are arranged in a circle around the rotor shaft, and R refers to a radius of the circle where the centers of the plurality of Hall switches are located, where R1+5 mm≤R≤R1+12 mm.

5. The servo motor according to claim 1, wherein the first Hall magnet and the Hall switches are all substantially rectangular, a length direction of the first Hall magnet is orthogonal to a radial direction of the planetary carrier, a length of the first Hall magnet is L1, a width of the first Hall magnet is W1, and a length of each Hall switch is L2, where $(2\pi R/N) \leq L1 \leq 1.5(2\pi R/N)$ and $L2 \leq W1 \leq 2L2$; R refers to a radius of a circle where centers of the plurality of Hall switches are located, and N refers to the reduction ratio.

6. The servo motor according to claim 1, wherein a distance S1 between the first Hall magnet and the Hall switch is greater than or equal to 2 mm and less than or equal to 6 mm.

7. The servo motor according to claim 1, wherein a distance S2 between the second Hall magnet and the position sensor is greater than or equal to 1 mm and less than or equal to 3 mm.

8. The servo motor according to claim 1, further comprising a printed circuit board arranged in the housing, the position sensor being arranged on the printed circuit board.

9. The servo motor according to claim 8, wherein one printed circuit board is provided.

10. The servo motor according to claim 9, wherein the printed circuit board is arranged at a rear part in the housing; a minimum distance S3 between the printed circuit board and a rear end cover of the housing is greater than or equal to 4 mm and less than or equal to 8 mm.

11. The servo motor according to claim 9, wherein a surface of the printed circuit board facing the stator and a surface of the printed circuit board away from the stator are each provided with an electronic component, wherein the position sensor is arranged on the surface of the printed circuit board facing the stator, and the electronic component arranged on the surface of the printed circuit board facing the stator generates less heat than the electronic component arranged on the surface of the printed circuit board away from the stator.

12. The servo motor according to claim 1, wherein the second Hall magnet is cylindrical or annular, the rotor is provided with a mounting groove, the second Hall magnet is arranged in the mounting groove, and an outer surface of the second Hall magnet is lower than or flush with an outer surface of the mounting groove.

13. The servo motor according to claim 1, wherein the second Hall magnet is arranged at an end of the rotor shaft facing the position sensor or at a position on the rotor support facing the position sensor.

14. The servo motor according to claim 1, wherein the planetary reduction mechanism further comprises an inner gear ring and a motor output shaft, the plurality of planetary gears mesh with the inner gear ring and the sun gear, and planetary shafts of the plurality of planetary gears are connected to the planetary carrier and the motor output shaft.

15. The servo motor according to claim 14, wherein the planetary reduction mechanism further comprises a rotor bearing, a bearing mounting groove is defined in the motor output shaft, a flange is arranged on the rotor shaft, the rotor bearing is fitted over the rotor shaft, an end of the rotor bearing abuts against the flange, and the other end of the rotor bearing abuts against an inner wall of the bearing mounting groove; or
the planetary reduction mechanism further comprises a rotor bearing, a bearing mounting hole is defined in the motor output shaft, the rotor bearing is fitted in the bearing mounting hole, and an end of the rotor shaft protrudes from the rotor bearing and is engaged by a circlip.

16. The servo motor according to claim 14, wherein a plurality of fitting holes penetrate through the motor output shaft, the plurality of fitting holes are in one-to-one correspondence with the plurality of planetary shafts, and at least part of the planetary shafts protrudes through the fitting holes; or
an end of the motor output shaft is provided with a plurality of fitting grooves, the plurality of fitting grooves are in one-to-one correspondence with the plurality of planetary shafts, and ends of the planetary shafts are fitted in the fitting grooves.

17. The servo motor according to claim 14, wherein the other end of the motor output shaft is provided with a positioning portion, the positioning portion comprising a first positioning portion and a second positioning portion, the first positioning portion and the second positioning portion are spaced apart in a radial direction of the motor output shaft, and the first positioning portion is arranged coaxially with the motor output shaft.

18. A robot, comprising:
a body assembly; and
a leg assembly rotatably connected to the body assembly and comprising:
a first leg,
a second leg pivotally connected to the first leg,
a servo motor, comprising:
a housing,
a rotor arranged in the housing and having a rotor support and a rotor shaft,
a stator arranged in the housing,
a planetary reduction mechanism arranged in the housing and comprising a sun gear, a planetary carrier, and a plurality of planetary gears, a reduction ratio of the planetary reduction mechanism being N:1, where N is a positive integer,
a first Hall magnet arranged on the planetary carrier,
a plurality of Hall switches corresponding to the first Hall magnet and arranged in the housing at even intervals around a rotation axis of the rotor shaft, wherein a number of Hall switches is N,
a second Hall magnet arranged on the rotor, and
a position sensor arranged in the housing and opposite the second Hall magnet, an output flange, and
a transmission component connected to the output flange and the second leg to drive the second leg to rotate relative to the first leg,
wherein the servo motor is arranged at a first end of the first leg, the motor output shaft of the servo motor is connected to the output flange to drive the output flange to rotate, the output flange is provided with a first limit portion, the first leg is provided with a first stop portion and a second stop portion, and the first stop portion and the second stop portion are spaced apart to limit a rotation angle of the output flange by stopping the first limit portion.

19. The robot according to claim 18, wherein the first leg is provided with a second limit portion configured to limit rotation of the second leg by stopping the transmission component; or
the output flange of the leg assembly is provided with a third limit portion configured to limit rotation of the second leg by stopping the transmission component.

20. The robot according to claim 18, wherein the transmission component comprises a connecting rod, a first end of the connecting rod is pivotally connected to the output flange by a first pivot, a second end of the connecting rod is pivotally connected to a first end of the second leg by a second pivot, and a second end of the first leg and the first end of the second leg are pivotally connected by a third pivot; or
the transmission component comprises a first pulley, a second pulley, and a transmission belt wound on the first pulley and the second pulley, the first pulley is mounted on the output flange, the second pulley is rotatably mounted on the second end of the first leg, and the first end of the second leg is connected to the second pulley.

* * * * *